United States Patent [19]

Smith

[11] Patent Number: 5,314,164
[45] Date of Patent: May 24, 1994

[54] PIVOTAL DIAPHRAGM, FLOW CONTROL VALVE

[75] Inventor: Daniel E. Smith, New Hampton, N.H.

[73] Assignee: MKS Instruments, Inc., Andover, Mass.

[21] Appl. No.: 916,064

[22] Filed: Jul. 17, 1992

[51] Int. Cl.⁵ .............................................. F16K 31/10
[52] U.S. Cl. ............................ 251/129.17; 251/129.2; 251/228; 251/335.2
[58] Field of Search .......... 251/129.17, 335.2, 129.04, 251/129.2, 129.18, 129.01, 228

[56] References Cited

U.S. PATENT DOCUMENTS

| | | |
|---|---|---|
| 1,794,703 | 3/1931 | Methudy . |
| 2,051,938 | 8/1936 | Carlson ........................ 251/129.2 |
| 2,313,128 | 3/1943 | Densten . |
| 2,675,508 | 4/1954 | Ray ............................. 251/129.2 |
| 2,709,431 | 5/1955 | Curtis . |
| 2,852,041 | 9/1958 | Stinson . |
| 2,902,221 | 9/1959 | Hajny ......................... 251/129.2 |
| 3,143,131 | 8/1964 | Spencer ...................... 251/129.2 |
| 3,570,807 | 3/1971 | Sturman ..................... 251/129.17 |
| 3,785,563 | 1/1974 | Maple . |
| 4,268,009 | 5/1981 | Allen, Jr. .................... 251/129.2 |
| 4,359,204 | 11/1982 | Williams . |
| 4,832,078 | 5/1989 | Szekely et al. . |
| 4,995,589 | 2/1991 | Adishian et al. . |

Primary Examiner—A. Michael Chambers
Attorney, Agent, or Firm—Lappin & Kusmer

[57] ABSTRACT

An improved structure for pivotal fluid valves is disclosed wherein an elongated pivot arm is pivotally mounted through a flexible, resilient corrosion-resistant diaphragm that serves to support and balance the pivot arm and as a frictionless pivot support. One end of the pivot arm provides modulated restriction on an orifice inside the valve chamber to control the fluid flow. The opposite end of the pivot arm is linked to suitable motive power for actuating the pivot arm.

31 Claims, 5 Drawing Sheets

PIVOTAL DIAPHRAGM, FLOW CONTROL VALVE

The present invention relates generally to an improvement in pivotal fluid valve assemblies, and more particularly, to a valve assembly in which an elongated pivot arm supporting the valve head is pivotally mounted through a flexible, resilient diaphragm seal that serves to pivotally support and balance the pivot arm at its pivot axis so that the valve head can be moved into and out of contact with a valve seat.

BACKGROUND OF THE INVENTION

Pivotal fluid valve assemblies are well-known in the art for a large variety of applications. For example, the prior art shows valve configurations in which an elongated arm, pivotal about a ball-and-socket arrangement, is connected at its distal, interior end to a valve-sealing head located inside the valve chamber. By manipulating the proximal, exterior end of the elongated arm, the arm can be caused to pivot about an intermediate point resulting in the valve-sealing head either engaging or disengaging a valve seat forming an inlet to or outlet from inside the valve chamber. Fluid flows freely through the valve chamber when the valve head is disengaged from the valve seat, but is stopped from flowing when the valve-sealing head engages the seat so as to seal off the orifice.

Representative of the prior art in this field is U.S. Pat. No. 2,313,128 (Densten). The Densten patent shows a fluid control valve for a water faucet in which an elongated arm 7 (see FIGS. 1-4), connected at one end to a spherical valve member 16, pivots about an intermediate semi-spherical pivot 6 that mates with a cupped washer or sealing element 5 made of rubber or similar elastic material. This is essentially a ball-and-socket arrangement which wears causing increasing mechanical tolerances which can ultimately result in the failure of the valve. Accordingly, instead of only two-directional (forward and back) pivoting, the Densten configuration permits essentially 360 degree rotation of arm 7 which, according to Densten, is advantageous because the valve element can "present a number of different surfaces to its seat and thus this valve element will not become gouged out or deformed due to repeated bearing at one point on said valve," (col. 1, lines 12-16).

U.S. Pat. No. 3,785,563 (Maple) shows a shut-off device for a traveling sprinkler system. As best seen in FIGS. 1 and 2, the valve portion of this device comprises an elongated arm 34, connected at one end to a spherical valve member 32, wherein arm 34 pivots about an intermediate spherical pivot 36 seated in an annular retainer member 52 and O-ring seal 54. As in the Densten patent, this is essentially a ball-and-socket arrangement which can wear resulting in increasing mechanical tolerances and ultimately failure of the valve assembly.

U.S. Pat. No. 1,794,703 (Methudy) shows a valve comprising an elongated valve stem 9 extending through a cap 10 and through a "diaphragm or seal 12 of flexible and pliable material such as leather or any other material or substance that will serve as an equivalent . . . " (page 1, lines 59-65). The "diaphragm" in Methudy is cup-shaped with the convex or outside portion of the cup surface projecting inwardly toward the interior of the valve. Stem 9 is not pivotal, but rather can be moved up or down to open or close the valve respectively by the manipulation of handle 23. Furthermore, in Methudy, seal 12 serves only to prevent leakage from the interior of the valve; it does not support stem 9 in any way. Instead, stem 9 is supported on screw 19 which, in turn, is supported on walls 4 and 5 by means of disc member 17.

A valve assembly which includes (1) a diaphragm which acts as a valve seal and (2) a pivot arm extending through the diaphragm is provided in a commercially available product by Burkert Contro-matic of Orange, Calif., as Burkert Type 300. The valve is a two position valve with its pivot arm being movable about a pivot axis above the diaphragm between an opened position wherein an outlet port is connected to a venting port, and a closed position wherein the venting port is closed and the inlet port is connected to the outlet port. The pivot arm is moved between the open and closed positions by an armature solenoid arrangement. The diaphragm is used solely as a seal to insure that material flowing through the valve does not interfere with the solenoid. Separate structure provided above the diaphragm (outside the fluid chamber) including a coil spring (which is used to kept the pressure outlet closed against the medium pressure) is provided to define the pivot axis about which the arm pivots and accordingly is subject to wear and increasing tolerances. Further, the structure does not provide, nor does it seem adequate to provide, accurate control of flow rate between the two open and closed positions. In addition, the construction of the diaphragm, which is shaped to cover the end of the pivot arm, necessitates the use of the elastomeric diaphragms, or costly metal shaped diaphragms due to the unusual shape of the diaphragm, and increases the swept wetted surface area within the valve chamber.

U.S. Pat. No. 4,359,204 (Williams) shows a diaphragm actuated-rod operated valve assembly characterized by a one-piece elastomeric valve-spring-seal member operated by a push rod. U.S. Pat. No. 2,852,041 (Stinson) shows a valve-like device for sampling fluid from a plurality of sources. Somewhat further removed from the pivotal fluid valve art are U.S. Pat. No. 4,995,589 (Adishian et al.) directed to a bellows valve, U.S. Pat. No. 4,832,078 (Szekely et al.) directed to a quick-action valve, and U.S. Pat. No. 2,709,431 (Curtis) directed to a hand-held body massaging device.

Friction between moving parts in these prior art assemblies results in increasing tolerances which may be unacceptable for many applications. Assemblies with longer life cycling are believed possible if the pivot about which a pivot arm moves to control the flow of fluid is frictionless. The frictionless pivot support can be made for applications which include the handling of corrosive or toxic materials without contamination, and with the swept wetted surface area within the chamber being as small as possible.

OBJECTS OF THE INVENTION

Accordingly, it is a principal object of this invention to provide a pivotal fluid flow control valve assembly adaptable for use with a wide range of different fluids, including corrosive and toxic materials.

Another, more specific object of the present invention is to provide a long-life fluid valve assembly with few internal components, with the components resistant to corrosion or deterioration.

A further object of this invention is to provide a multipurpose diaphragm pivot for a fluid valve assembly that supports and balances a pivot arm so that the pivot arm moves about a frictionless pivot or hinge point, provides a force balancing mechanism and provides a frictionless fluid seal.

Still another object of this invention is to provide a flow control valve assembly construction which prevents supply pressure forces from overcoming motive force used to position the control pivot arm by balancing exerted force on a diaphragm pivot around the pivot axis.

Yet another object of this invention is to provide a pivotal fluid valve that is easily actuatable by any one of a variety of actuating means.

And still another object of the present invention is to provide a pivotal flow control fluid valve assembly which easily can be configured as a normally opened or normally closed valve.

And yet another object of the present invention is to provide a pivotal flow control valve assembly in which mechanical advantage for stroke or force may be attained by biasing the length of the pivot arm.

And still another object of the present invention is to provide a pivotal flow control fluid valve assembly in which the pivot axis is provided in an eccentric position of a diaphragm to balance supply pressure forces on the orifice through which fluid flows.

And yet another object of the present invention is to provide a pivotal flow control valve assembly in which the diaphragm pivot may be corrugated in a specific configuration to improve serviceable life of the diaphragm by distributing and reducing stress around the pivot point.

And still another object of the present invention is to provide a pivotal flow control fluid valve assembly in which a variety of metal to metal seal, or polymer seal technologies may be easily employed (depending upon the application) to properly seal the valve chamber.

And yet another object of the present invention is to provide a pivotal flow control valve assembly in which the swept wetted surface area exposed to the fluid flowing through the valve is kept small, making the present invention suitable for ultra-clean semi-conductor applications.

And still another object of the present invention is to provide a pivotal flow control fluid valve assembly having a simplified construction so that the valve assembly can be constructed in limited quantities with specialty materials, such as chemical resistant polymers.

And yet another object of the present invention is to provide a pivotal flow control valve assembly in which the orifice through which the fluid flows, can be easily interchanged to allow for a change in fluid flow range, all within a common valve platform.

And still another object of the present invention is to provide a pivotal flow control fluid valve assembly having an adjustable diaphragm pivot location allowing for precise positioning of the orifice seal, outside of the flow path.

Other objects of the invention will in part be obvious and will in part appear hereinafter. The invention accordingly comprises the apparatus possessing the construction, combination of elements, and arrangement of parts exemplified in the following detailed disclosure, and the scope of the application of which will be indicated in the claims.

SUMMARY OF THE INVENTION

The fluid valve assembly of this invention comprises a valve chamber having a valve seat defining at least one orifice; an elongated pivot arm extending from outside the valve chamber into the interior and mounted through a flexible, resilient, corrosion-resistant diaphragm so that the arm pivots in the diaphragm moving a valve body or plug toward or away from the orifice; and, flow regulating means for controlling the pivotal position of the pivot arm so as to control the rate of fluid flow through the orifice.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

Figure 1A:
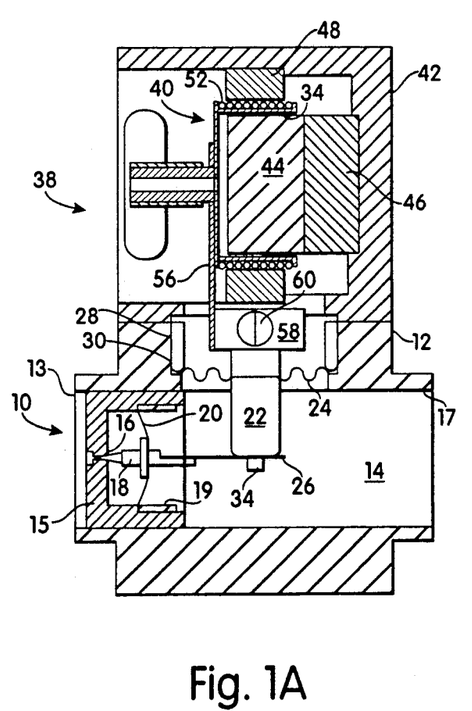
FIG. 1A is a front elevational view, in cross-section, of a first embodiment of the present invention in the form of a voice coil actuated, pivotal diaphragm, flow control valve assembly, with the valve assembly shown in the totally "closed" position.
Figure 1B:
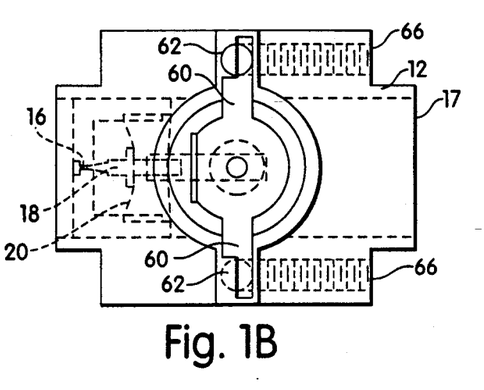
FIG. 1B is a partly cutaway, top view of the valve assembly of FIG. 1A.
Figure 1C:
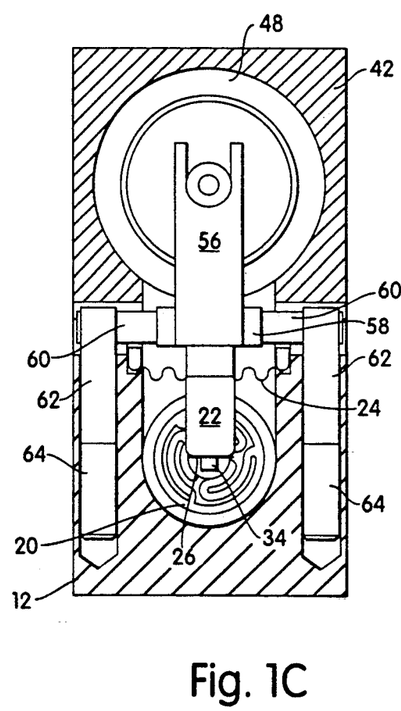
FIG. 1C is a left side elevational view, in cross-section, of the valve assembly of FIG. 1A.

FIG. 1A-1C illustrate the overall construction of one embodiment of the pivotal diaphragm, flow control valve assembly of the present invention. The valve assembly 10 is shown in conjunction with a valve-actuation, flow regulating means 38 for regulating the flow of fluid through the valve, which in this embodiment is a voice coil assembly. The valve assembly 10 generally comprises a valve housing 12 having openings 13 and 17 respectively at opposite ends of and in fluid communication with an interior chamber 14. A cupped shaped insert 15 is secured in the housing 12 and includes an orifice 16 of precise dimensions, in communication with interior chamber 14 so as to define the valve seat. The dimensions of orifice 16 determine the flow rate range of the valve assembly 10. An orifice plug or valve body 18 is mounted on (in the center of) return spring 20, preferably in the form of a flat disc spring as best seen in FIG. 1C. Preferably, when the assembly is used to control a range of relatively low flow rates, opening 13 is used as the inlet, while opening 17 is used as the outlet in order to reduce controlled volume and thus enhance the ability of the assembly to control flow rate. Conversely, when used to control a range of relatively high flow rates, volume control is not a concern. Thus, in the latter case the opening 17 is preferably used as the inlet and opening 13 is used as the outlet in order to take advantage of the internal pressure and force thus created to aid sealing of orifice plug 18 against orifice 16.

The return spring 20 is secured to the insert 15 between an annular shoulder formed by a counterbore within the insert and a retaining ring 19 force fitted in the counter bore, all positioned within chamber 14. A pivot arm 22 is pivotally mounted in diaphragm 24 with its distal, internal end connected to plug 18 through linkage spring 26 so that the plug can be moved into and out of engagement with the valve seat defining orifice 16. Sealing means are provided between pivot arm 22 and diaphragm 24 to maintain a leak-proof seal along the pivot arm-diaphragm interface since the diaphragm forms a surface of the chamber 14. A variety of metal seal technologies may be advantageously employed to effect the pivot arm-diaphragm seal such as gold or nickel C-seals and VCR type radius and welded seals. As shown in FIG. 1A, an annular diaphragm ring seal 28 is used to seal the outer periphery of diaphragm 24 to the inner annular shoulder of an annular lip 30 of valve housing 12.

Diaphragm 24 comprises a flexible, resilient, corrosion and solvent-resistant material depending upon the fluid with which the assembly is used to control. The diaphragm can be made of a metal or metal alloy. Suitable materials for making the diaphragm include stainless steel such as 316 L SS, a stainless steel sold under the name VimVar (Vacuum Induction Melt Vacuum Arc Melt), or alloys, such as the one manufactured under the name Inconel by Inco Alloys International. Alternatively, the diaphragm can be made of a chemical resistant polymer, such as the material manufactured and sold under the trademark Teflon by Dupont, Inc of Wilmington, Del. Diaphragm 24 must have sufficient structural integrity and sufficient resilience to accommodate repeated pivoting of the pivot arm about the pivot axis where the pivot arm passes through the diaphragm. The pivot axis of the pivot arm lies in the plane of the general plane of the diaphragm so that as the pivot arm rotates about the pivot axis the diaphragm twists in opposing directions creating a frictionless central point of rotation or pivot. The appropriate thickness for the diaphragm may range from about one to ten mils depending on the force provided by valve actuation means 38, the desired seating force of the plug in the valve seat (which will depend upon the pressure of the fluid for which the valve assembly is used, and the leverage provided by the dimensioning of the distances between the location of the pivot center of the pivot arm at the diaphragm and each of the points of the pivot arm where translation force is applied by the valve actuation means and force is applied to the plug 18 towards the orifice 16). In a preferred embodiment, as illustrated in FIG. 1A, diaphragm 24 may be of corrugated construction to enhance both the strength and the resilience of this member. In the preferred embodiment the pivot arm is secured through the center of the diaphragm and the corrugations are concentric with respect to that center. It is contemplated under the present invention that the corrugations can be of a different shape, such as elliptical, to improve the serviceable life of the diaphragm by distributing and reducing the stress around the pivot point. In addition, the pivot arm can be mounted in the circular diaphragm off center from the center of the diaphragm (i.e., eccentrically) so as to provide a differential valve in order to balance supply pressure forces on the orifice 16. In this situation, the pivot point of the arm in the plane of the diaphragm is disposed closer to the valve body 18 and orifice 16 defining the valve seat than the center of the diaphragm. As the supply pressure increases within the chamber 14, the diaphragm expands. As the diaphragm expands uneven forces are applied relative to the pivot arm due to the larger surface area of the diaphragm on one side of the arm (opposite from the plug 18 and orifice 16) relative to the surface area of the diaphragm on the other side of the arm (toward plug 18 and orifice 16), causing the pivot arm to pivot about its pivot axis and causing the plug 18 to move away from the orifice 16 creating greater flow. Similarly, should the pressure on the diaphragm decrease causing the diaphragm to move inwardly toward the chamber 14, the pivot arm would pivot about its pivot axis causing the plug to move toward the orifice 16 creating less flow.

Pivot arm 22 preferably comprises a tubular or cylindrical shaft that passes through and is pivotally supported by diaphragm 24 at the point where the arm pivots. As used herein, the proximal or outer end of pivot arm 22 refers to the exterior arm segment extending from the diaphragm 24, outside of interior chamber 14, whereas the distal or inner end of pivot arm 22 refers to the interior arm segment extending from the diaphragm 24 inside chamber 14. As shown in FIG. 1A, pivot arm 22 includes a pin or nipple 34 projecting from its distal end adapted to mate with an aperture in linkage arm 26. Alternative means for coupling pivot arm 22 and linkage arm 26, e.g. screw or rivet-type fasteners, will be apparent to those skilled in the art and are within the scope of this invention.

Pivot arm 22 is preferably of metallic construction, and at least the exposed surface of the inner segment of the arm inside chamber 14 comprises a corrosion and solvent-resistant material. Similarly, the exposed surfaces of insert 15, plug 18, retaining ring 19, return spring means 20, and linkage arm 26, as well as the walls of chamber 14, preferably all are made of a corrosion and solvent-resistant material. The springs, for example, can be made of Elgiloy, an alloy manufactured by Elgiloy Company of Elgin, Ill., while the other parts can be made of 316 L SS stainless steel. The construction of the diaphragm valve assemblies of this invention thus avoids exposing any elastomeric material to the fluid contained in or passing through valve chamber 14. On the other hand, under certain conditions, the exposed surfaces inside chamber 14 may comprise chemical resistant polymers, such as Teflon manufactured and sold by DuPont Co. of Wilmington Del., or Kel-F manufactured and sold by 3M Co of Minneapolis, Minn. As a result, the valves of this invention can be effectively used with a wide range of fluids containing corrosive or organic components while minimizing the risk of seal deterioration and possible failure. For similar reasons, the valves of this invention virtually eliminate the problems of valve orifices becoming plugged with elastomeric decomposition particles and of the fluid passing through the valve becoming contaminated, thus causing an unsealed or leaking condition.

Suitable actuation means 38 are utilized to provide motive power for actuating pivot arm 22 so as to move the plug 18 relative to the valve seat defined by orifice 16. In FIG. 1A, the valve-actuation means 38 comprises a voice coil assembly 40. The voice coil assembly 40 is of a conventional design, and includes means for defining a magnetic circuit which includes an air gap through which a coil can move. More specifically, assembly 40 includes a magnetically conductive case 42, and a permanent magnet 44 secured to the case with magnetically conductive element 46. Magnetically conductive pole pieces 48 are circumferentially spaced around the magnet 44 so as to define an air gap 50, as is well known in the art. In the preferred embodiment shown, the air gap is cylindrical, although in practice the air gap can be of other geometrical configurations. A coil 52 would onto a magnetically conductive cylinder 54 is positioned in air gap 50 so as to be movable through the air gap along the cylindrical axis of the coil in response to current provided through the coil. The cylinder 54 of the voice coil assembly 40 is secured to a control arm 56, which in turn is secured to a retaining disk 58 for securing the control arm 56 to the proximal end of pivot arm 22 with suitable means such as a spot weld (not shown). As best seen in FIGS. 1B and 1C, a flexure pin 60 extends diametrically through disk 58. The opposite ends of the arm 60 are each formed with a planar vertically oriented surface so that the end of each arm can be secured to a similar planar vertically oriented surface of a corresponding flat flexure spring 62 so that the springs 62 are retained in place. Each spring 62 is secured to or formed with a flexure pin 64, the latter being anchored in the housing 12, the two pins being on opposite sides of the chamber 14. A pair of set screws 66 (seen in FIG. 1C in phantom) respectively engage the pins 64 in order to restrain the pins and thus the structure supported by the pins from sliding up and down, regardless of internal or external pressures.

Figure 2:
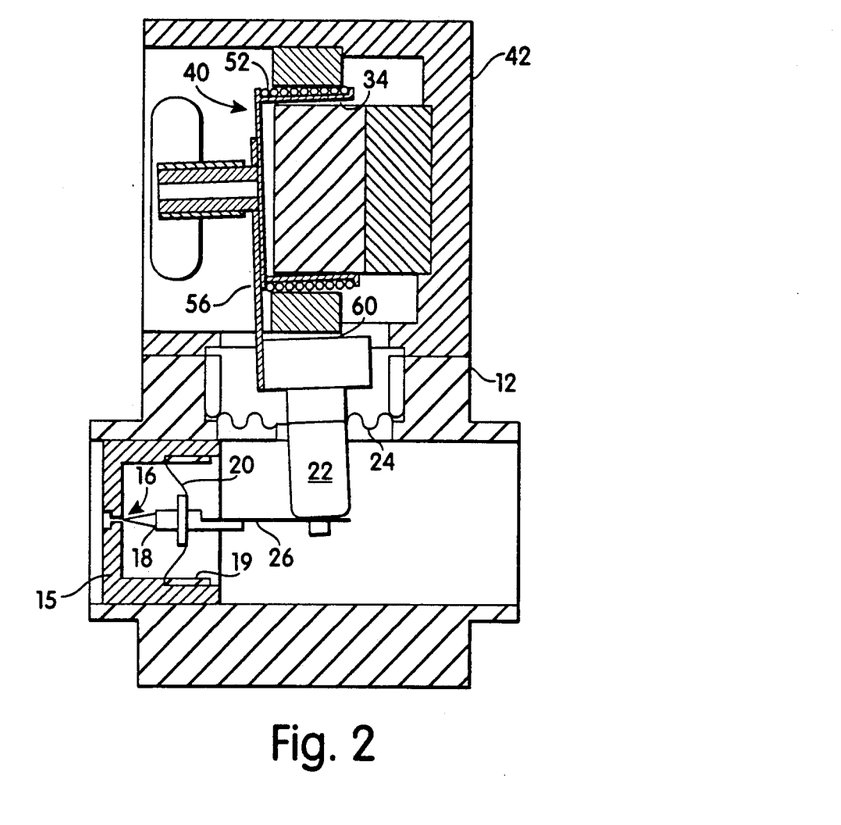
FIG. 2 is a front elevational view in cross-section of the voice coil actuated valve assembly of FIGS. 1A-1C, with the valve assembly shown in an "open" position.

The operation of the pivotal diaphragm valve of this invention is understood by reference to FIGS. 1A and 2. In FIG. 1A, the valve assembly is a normally closed valve and is shown in the "closed" position so that in the absence of current in coil 52 of the voice coil assembly 40 the orifice plug 18 completely seals orifice 16 with sufficient force so as to provide positive shut-off. Set screws 66 are used to adjust the position of the pivot axis within the plane of the diaphragm so that the plug 18 is properly positioned relative to the orifice 16 between its fully open and fully closed positions. When it is desired to open the valve assembly in order to provide a predetermined rate of flow through the valve assembly, a predetermined amount of force is applied to the proximal end of pivot arm 22 by actuating means 38 so that the plug 18 moves a predetermined amount away from orifice 16 (as seen in FIG. 2) against the force provided by the return spring 20 so that the predetermined flow rate is achieved. The predetermined amount of force is controlled by the amount of current applied to the coil 52 of the voice coil assembly 40. The force is transmitted by the distal end of pivot arm 22 to linkage arm 26 and thereby to plug 18 by the essentially frictionless pivoting action of arm 22 about an axis extending through the plane of the diaphragm 24. Mechanical advantage can be obtained by biasing the lengths of the proximal and distal ends of the pivot arm, i.e. by having the proximal end longer than the distal end. As a result of arm 22 pivoting on diaphragm 24, force applied to the proximal end of arm 22 results in plug 18 moving away from the orifice 16 to allow fluid flow into chamber 14 at a predetermined rate. In addition to forcing the plug 18 back into contact with the valve seat defined by orifice 16, return spring 20 serves to center plug 18 with respect to orifice 16 thereby maintaining these members in axial alignment. Spring 20 also assists in resisting displacement of plug 18 from its seated position while, at the same time, permitting limited axial displacement of plug 18.

As shown in FIG. 2, upon release of or reduction in the force applied by the actuating means to the proximal end of arm 22, the inlet fluid force will drive plug 18 in an axial direction out of sealing engagement with orifice 16, as shown in FIG. 2, thereby permitting fluid flow into chamber 14 and causing arm 22 to pivot in a first direction. This axial displacement of plug 18 will cause stretching or distention of spring means 20, again as seen in FIG. 2.

The valve assembly shown in FIGS. 1A–1C and 2, is a normally closed design. The design can easily be modified to a normally open design, wherein the actuating means 38 can provide force in a direction that causes plug 18 to move from a position spaced from the orifice to a position where it engages the valve seat defining the orifice 16 so as to sealably engage the orifice to provide positive shut-off. In such a configuration, the return spring 20 is used to return the plug 18 to its fully open position and the flow regulating means 38 is used to move the plug toward the orifice 16. Set screws 66 are again used to adjust the position of the pivot axis within the plane of the diaphragm so that the plug 18 is properly positioned relative to the orifice 16. In the normally open design, actuating means 38 must provide sufficient force to overcome the internal valve fluid pressure and the resistance of spring means 20 to cause arm 22 to pivot into engagement with orifice 16 in order to "close" the valve. The device of FIGS. 1A–1C and 2 could also be readily modified to serve as a simple shut-off valve without regulating the flow rate of fluid through the valve.

Figure 3A:
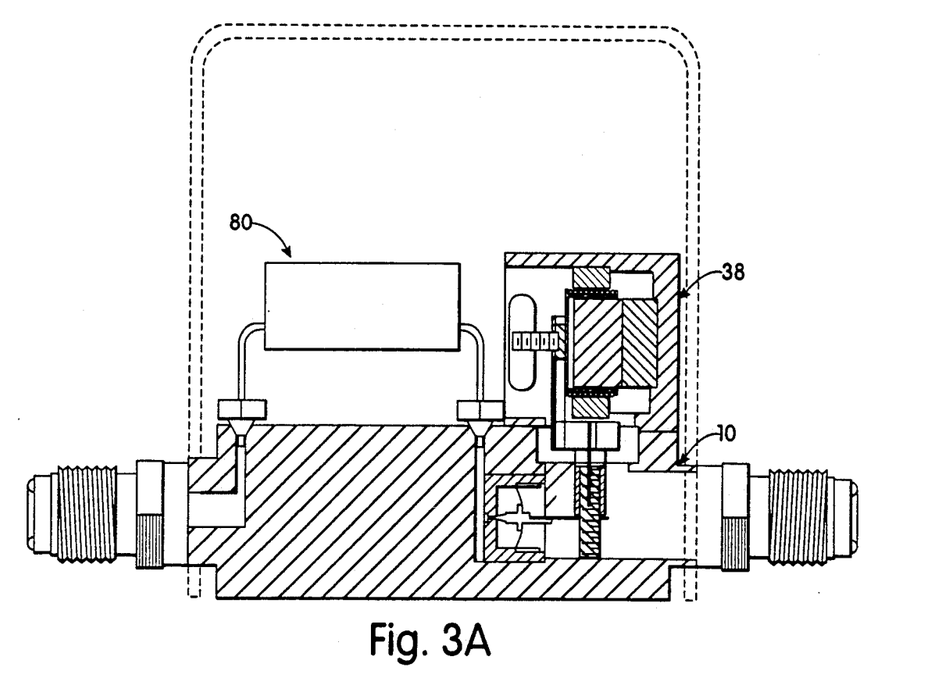
FIG. 3A is a front elevational view, in cross-section, of the voice coil actuated valve assembly, of FIGS. 1A-1C and 2, operating as part of a mass flow controller system.
Figure 3B:
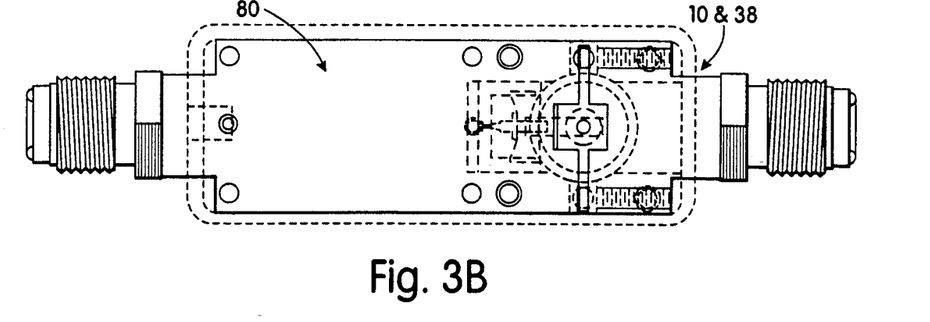
FIG. 3B is a top view in cross-section of the mass flow controller system of FIG. 3A.

FIGS. 3A and 3B illustrate how the pivot valve assembly of FIGS. 1A–1C and 2 can be incorporated into a mass flow controller system 70. The pivotal diaphragm valve assembly 10 and flow regulating means are shown connected to a mass flow measurement system 80, such as the one described in U.S. Pat. No. 4,464,932 issued Aug. 14, 1984 to James H. Ewing et al., and assigned to the present assignee. The mass flow measurement system 80 provides a electrical signal as a function of mass flow detected. This electrical signal can be appropriately scaled and applied to the coil 52 of the voice coil assembly 40.

Figure 4A:
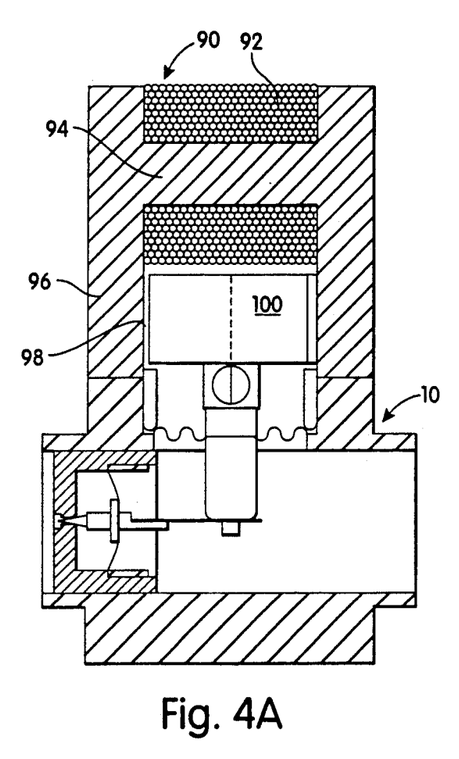
FIG. 4A is a front elevational view, in cross-section, of a second embodiment of the present invention in the form of a solenoid actuated, pivotal diaphragm, flow control valve assembly, with the valve assembly shown in the "closed" position.
Figure 4B:
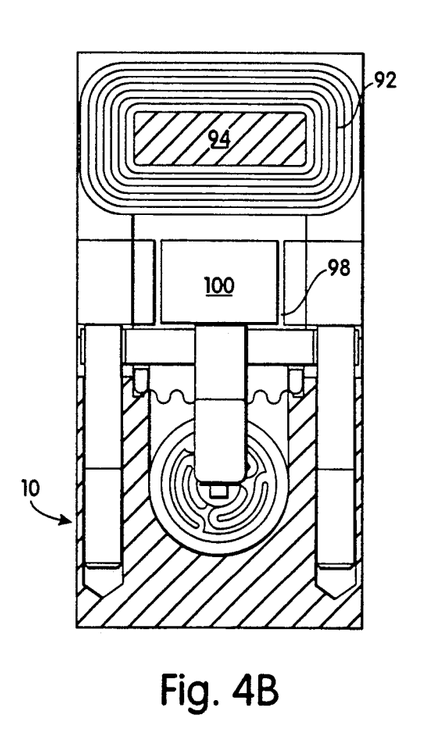
FIG. 4B is a left side elevational view in cross-section of the valve assembly of FIG. 4A.
Figure 5:
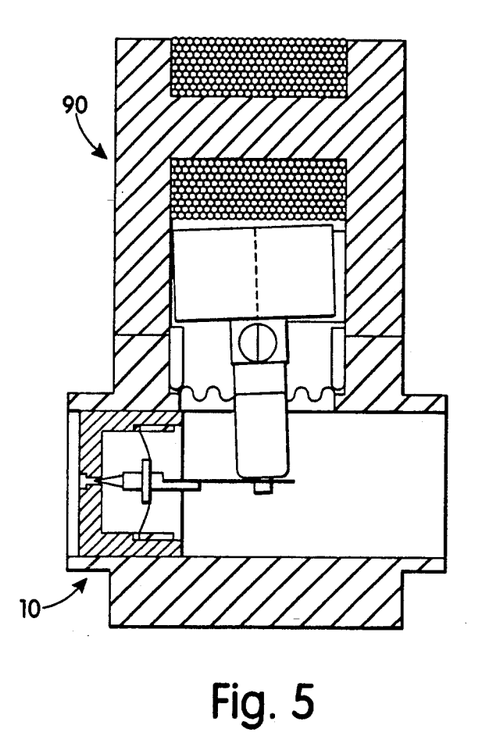
FIG. 5 is a front elevational view in cross-section of a solenoid actuated valve assembly of FIGS. 4A and 4B, with the valve shown in an "open" position.

The flow rate is controlled by the voice coil assembly 40. It should be appreciated that alternative mechanical motive systems can be used for controlling the position of pivot arm 22 so as to regulate the flow of fluid through the valve chamber 14. For example, a solenoidal regulating system 90 is shown in FIGS. 4A and 4B as controlling the pivotal position of the pivot arm. In this embodiment a coil 92 is provided around a magnetically conductive core 94 which forms a part of a magnetically conductive case 96. A magnetic gap 98 is created. A block 100 of magnetic material is secured to the proximate, outer end of pivot arm 22 within the gap 98 so that as current is applied to the coil 92, a force is applied to the block 100 so as to pivot the arm about an axis extending through the plane of the diaphragm.

Other flow regulating means include pneumatic systems, piezoelectric, piezopneumatic, and bimetallic systems, as well as stepper or DC motor drives. All of these systems are well known in the art as means for converting energy into mechanical movement.

As discussed above, the advantages of the present invention include the provision of a pivotal, fluid flow, control valve assembly adaptable for use with a wide range of different fluids, including corrosive and toxic material and having a long-life with few internal components, with the components resistant to corrosion or deterioration. A main advantage of the present invention is achieved by the multipurpose diaphragm pivot that supports and balances a pivot arm so that the pivot arm (1) moves about a frictionless pivot or hinge point, (2) provides a force balancing mechanism and (3) provides a frictionless fluid seal. The use of the preferred electro-mechanical flow regulating means prevents the supply pressure force in the orifice 16 from overcoming motive force used to position the control pivot arm by balancing exerted force on a diaphragm pivot around the pivot axis. The pivot arm, diaphragm design is easily actuatable by any one of a variety of actuating means, including the voice coil assembly 38 and the solenoid assembly 90 shown in the FIGS. The valve assembly is easily adaptable for use in a flow measurement and control system such as shown in FIGS. 3A and 3B. The pivotal, flow control fluid valve assembly can easily be configured as a normally opened or normally closed design. The pivotal flow, control valve assembly is designed so that mechanical advantage for stroke or force may be easily attained by biasing the length of the pivot arm. The pivot axis of pivot arm 22 can be provided in an eccentric position of a diaphragm to balance supply pressure forces on the orifice 16 or off center as described. The diaphragm may be corrugated in a specific configuration to improve serviceable life of the diaphragm by distributing and reducing stress around the pivot axis. The design makes it easy to use a variety of metal to metal seal, or polymer seal technologies, depending upon the application, to properly seal the valve chamber 14. The design provides a small swept wetted surface area exposed to the fluid flowing through the valve making the present invention suitable for ultra-clean semiconductor applications. The fluid valve assembly has a simplified construction so that the valve assembly can be constructed in limited quantities with specialty materials, such as chemical resistant polymers. The range of flow rates determined by the dimensions of the orifice 16 can be easily interchanged by interchanging the insert 15 (with a different size orifice) so as to allow for fluid flow range change in a common valve platform. Finally, the assembly has an adjustable diaphragm pivot location allowing for precise positioning of the orifice seal, outside of the flow path.

Since other changes may be made in the above-described apparatus and process without departing from the scope of the invention herein involved, it is intended that all matter contained in the above description shall be interpreted in an illustrative and not in a limiting sense.

What is claimed is:

1. Valve assembly for regulating the flow of fluid, said assembly comprising:
    (a) housing means defining a valve chamber having means for defining at least one orifice through which fluid flows;
    (b) diaphragm means for defining at least a surface internal to said valve chamber and a surface external to said valve chamber; and,
    (c) fluid flow regulating means for controlling the flow of fluid through the orifice at a rate proportional to the strength of an external signal, said flow regulating means comprising:
        (i) pivot means comprising a first control member projecting outwardly with respect to said valve chamber from the external surface of said diaphragm means, a second control member projecting inwardly with respect to said valve chamber from the internal surface of said diaphragm means along a longitudinal control member axis substantially perpendicular to the plane of said diaphragm means, said first and second control members defining a pivot axis lying in the plane of said diaphragm means;
        (ii) plug means movable along a plug axis substantially perpendicular to said control member axis between a sealing position wherein said plug means sealingly engages said orifice so as to provide positive shut off and multiple non-sealing positions wherein said plug means at least partly disengages said orifice so as to provide fluid flow through said chamber;
        (iii) means for connecting said second control member to said plug means; and,
        (iv) pivot support means for supporting said pivot means relative to said valve chamber so as to obtain restricted, substantially frictionless pivoting of said pivot means in order to move said plug means along said plug axis, said pivot support means comprising an elongated support member fastened to said first control member such that the longitudinal axis of said support member is substantially perpendicular to said control member axis and to said plug axis, and means for flexibly linking said elongated support member to said housing means.

2. Valve assembly according to claim 1, further comprising means for maintaining said plug means in axial alignment with said orifice while also permitting restricted axial displacement of said plug means.

3. Valve assembly according to claim 1, further comprising linkage means for connecting said second control member to said plug means.

4. Valve assembly according to claim 3, wherein said linkage means comprises a linkage spring secured at one end to said plug means and, at the opposite end, to said second control member.

5. Valve assembly according to claim 1, wherein said fluid flow regulating means further comprises actuating means connected to said first control member.

6. Valve assembly according to claim 5, wherein said actuating means applies a substantially continuous range of forces to said pivot means so as to regulate the flow rate of fluid through said orifice.

7. Valve assembly according to claim 6, wherein said actuating means is a voice coil assembly.

8. Valve assembly according to claim 6, wherein said actuating means is a solenoid assembly.

9. Valve assembly according to claim 1, wherein said diaphragm means consists essentially of metal, a metal alloy or a corrosion resistant polymer.

10. Valve assembly according to claim 9, wherein said metal or metal alloy is selected from the group consisting of stainless steel, Inconel and Vimvar.

11. Valve assembly according to claim 1, wherein said diaphragm means has a corrugated construction.

12. Valve assembly according to claim 11, wherein said diaphragm means comprises concentric corrugations about the point defined by the intersection of said control member axis with said diaphragm means.

13. Valve assembly according to claim 12, wherein said concentric corrugation are substantially circular in shape.

14. Valve assembly according to claim 12 wherein said concentric corrugations are substantially elliptical in shape.

15. Valve assembly according to claim 1, wherein said diaphragm means is of substantially circular shape.

16. Valve assembly according to claim 1, wherein said control member axis passes substantially centrally through said diaphragm means.

17. Valve assembly according to claim 1, wherein said control member axis passes through said diaphragm means eccentrically with respect to the center of said diaphragm means.

18. Valve assembly according to claim 1, wherein said means for defining at least one orifice comprises a cupped shaped insert member defining said orifice, said insert member being shaped and sized to fit securely within an opening in said housing means so that insert members defining different size orifices can be easily substituted depending upon the fluid flow range desired.

19. A mass flow measurement and control system comprising:
(1) a valve assembly for regulating the flow of fluid through an orifice, said assembly comprising:
   (a) housing means defining a valve chamber having means for defining at least one orifice through which fluid flows;
   (b) diaphragm means for defining at least a surface internal to said valve chamber and a surface external to said valve chamber; and,
   (c) fluid flow regulating means for controlling the flow of fluid through the orifice at a rate proportional to the strength of an external signal, said flow regulating means comprising:
      (i) pivot means comprising a first control member projecting outwardly with respect to said valve chamber from the external surface of said diaphragm means, a second control member projecting inwardly with respect to said valve chamber from the internal surface of said diaphragm means along a longitudinal control member axis substantially perpendicular to the plane of said diaphragm means, said first and second control members defining a pivot axis lying in the plane of said diaphragm means;
      (ii) plug means movable along a plug axis substantially perpendicular to said control member axis between a sealing position wherein said plug means sealingly engages said orifice so as to provide positive shut off and multiple non-sealing positions wherein said plug means at least partly disengages said orifice so as to provide fluid flow through said chamber;
      (iii) means for connecting said second control member to said plug means; and,
      (iv) pivot support means for supporting said pivot means relative to said valve chamber so as to obtain restricted, substantially frictionless pivoting of said pivot means in order to move said plug means along said plug axis, said pivot support means comprising an elongated support member fastened to said first control member such that the longitudinal axis of said support member is substantially perpendicular to said control member axis and to said plug axis, and means for flexibly linking said elongated support member to said housing means;
(2) actuating means for applying a substantially continuous range of forces to said pivot means so as to regulate the flow rate of fluid through said orifice as a function of a control signal; and
(3) means for measuring the flow of fluid into said valve and for generating said control signal as a function of said measured flow.

20. In a valve apparatus for regulating fluid flow comprising a housing defining a valve chamber, inlet and outlet fluid orifices between the valve chamber and the exterior of said housing, and an aperture in a wall of said housing, the improvement comprising:
(a) an annular lip in said wall of said housing adjacent said aperture;
(b) diaphragm means adapted to seat on said annular lip and thereby sealably cover said aperture and an annular member adapted to seat on said diaphragm means so as to sandwich said diaphragm means between said annular lip and one edge of said annular member; and
(c) fluid flow regulating means comprising:
   (i) pivot means comprising a first control member projecting outwardly with respect to said valve chamber from the external surface of said diaphragm means, a second control member projecting inwardly with respect to said valve chamber from the internal surface of said diaphragm means along a longitudinal control member axis substantially perpendicular to the plane of said diaphragm means, said first and second control members defining a pivot axis lying in the plane of said diaphragm means;
   (ii) plug means movable along a plug axis substantially perpendicular to said control member axis between a sealing position wherein said plug means sealingly engages at least one of said fluid orifices so as to provide positive shut off and multiple non-sealing positions wherein said plug means at least partly disengages the fluid orifice so as to provide fluid flow through said chamber;
   (iii) means for connecting said second control member to said plug means; and,
   (iv) pivot support means for supporting said pivot means relative to said valve chamber, said pivot support means comprising an longitudinal support member connected to said first control member such that the longitudinal axis of said support member is substantially perpendicular to said control member axis and to said plug axis, and means for flexibly linking said elongated support member to said housing means.

21. Apparatus of claim 20 further comprising diametric slots in the wall of said annular member adapted to receive opposite ends of said elongated support member.

22. Apparatus of claim 21 further wherein the opposite ends of said elongated support member project beyond the wall of said annular member when said opposite ends are received in said slots.

23. Apparatus of claim 22 further comprising flexure members fastened at a first end thereof to each of said opposite ends of said elongated support member, each of said flexure members (a) projecting substantially perpendicular with respect to the longitudinal axis of said support member and (b) having a second end thereof adapted to engage said housing.

24. Apparatus of claim 23 further wherein each of said flexure members comprises a flat flexure spring section and a pin section at the second end thereof.

25. Apparatus of claim 24 further wherein said pin section of each flexure member is adapted to mate with a correspondingly sized bore in said housing, said bores being on opposite sides of said valve chamber.

26. Apparatus of claim 20 wherein said fluid flow regulating means further comprises actuating means connected to said first control member.

27. Apparatus of claim 26 wherein said actuating means applies a substantially continuous range of forces to said pivot means so as to regulate the fluid flow rate.

28. Apparatus of claim 27 wherein said actuating means is a voice coil assembly.

29. Apparatus of claim 27 wherein said actuating means is a solenoid assembly.

30. Apparatus of claim 20 wherein said diaphragm means consists essentially of metal, a metal alloy or a corrosion resistant polymer.

31. Apparatus of claim 30 wherein said metal or metal alloy is selected from the group consisting of stainless steel, Inconel and Vimvar.

* * * * *